(12) United States Patent  (10) Patent No.: US 8,978,662 B2
Taniguchi  (45) Date of Patent: Mar. 17, 2015

(54) TOBACCO FILTER CONTAINING MAGNESIUM ALUMINOMETASILICATE

(75) Inventor: Hiroki Taniguchi, Hyogo (JP)

(73) Assignee: Daicel Chemical Industries, Ltd., Osaka-shi, Osaka (JP)

( * ) Notice: Subject to any disclaimer, the term of this patent is extended or adjusted under 35 U.S.C. 154(b) by 863 days.

(21) Appl. No.: 13/135,086

(22) Filed: Jun. 24, 2011

(65) Prior Publication Data

US 2011/0253155 A1   Oct. 20, 2011

(51) Int. Cl.
*A24D 3/00* (2006.01)
*A24D 3/16* (2006.01)
*B01J 20/16* (2006.01)

(52) U.S. Cl.
CPC .. *A24D 3/16* (2013.01); *B01J 20/16* (2013.01)
USPC .......................................... 131/331; 131/342

(58) Field of Classification Search
USPC ........................... 131/331, 342, 352–359, 361
See application file for complete search history.

(56) References Cited

U.S. PATENT DOCUMENTS

| 2,613,672 | A | * | 10/1952 | Sartoretto et al. | ............ 131/355 |
| 2,933,420 | A | * | 4/1960 | Haden, Jr. | ...................... 131/331 |
| 3,049,449 | A | * | 8/1962 | Allegrini | .......................... 502/80 |
| 3,718,612 | A | * | 2/1973 | Strickman | ....................... 521/55 |
| 4,246,009 | A | | 1/1981 | Sawada et al. | |
| 4,668,648 | A | | 5/1987 | Strack et al. | |
| 2004/0237983 | A1 | | 12/2004 | Sasaki et al. | |

FOREIGN PATENT DOCUMENTS

| CH | 499 274 | | 11/1970 |
| EP | 0 740 907 | A1 | 11/1996 |
| FR | 2 306 645 | A1 | 11/1976 |
| GB | 1 134 030 | | 11/1968 |
| GB | 1481680 | A * | 8/1977 |
| JP | 60-147437 | | 9/1985 |
| JP | 02-273169 | A | 11/1990 |
| JP | 3895327 | | 12/2006 |
| JP | 2007-319080 | A | 12/2007 |

OTHER PUBLICATIONS

Definition of dispersed particles, The Free Dictionary by Farlex, no date, [online], [retrieved on May 14, 2014]. Retrieved from the Internet: <URL: http://www.thefreedictionary.com/dispersed+particles>.*
MSDS for magnesium aluminum silicate, Spectrum Laboratory Products, Inc., [online], 2009, 6 pages, [retrieved on May 14, 2014]. Retrieved from the Internet: <URL: https://www.spectrumchemical.com/MSDS/M3013.pdf>.*
"Smectite Group", mineral information sheet, mindat.org, [online], retrieved from the Internet, no date [retrieved Nov. 6, 2014], <URL: http://www.mindat.org/min-11119.html>.*
"VEEGUM®/ VAN GL® The Story" and "VEEGUM®/ VAN GL® The Products", Vanderbilt Minerals, LLC, 2014, [online], retrieved from the Internet, no date [retrieved Nov. 6, 2014], <URL: http://www.vanderbiltminerals.com/ee_content/Documents/Technical/VEEGUM_VAN_GEL_English_Web.pdf>.*

(Continued)

*Primary Examiner* — Dennis Cordray
(74) *Attorney, Agent, or Firm* — Flynn, Thiel, Boutell & Tanis, P.C.

(57) ABSTRACT

A tobacco filter contains from 0.5 to 95% by mass of magnesium aluminometasilicate.

5 Claims, 1 Drawing Sheet

(56) References Cited

OTHER PUBLICATIONS

"aluminium magnesium silicate(2:1:2)", Chemical Book, CAS 12511-31-8, [online], retrieved from the Internet, no date [retrieved Nov. 6, 2014], <URL: http://www.chemicalbook.com/ChemicalProductProperty_EN_CB8912635.htm>.*

European Patent Office Search Report dated Nov. 28, 2011 (5 sheets).

Japanese Office Action dated Oct. 8, 2013, including English translation thereof.

* cited by examiner

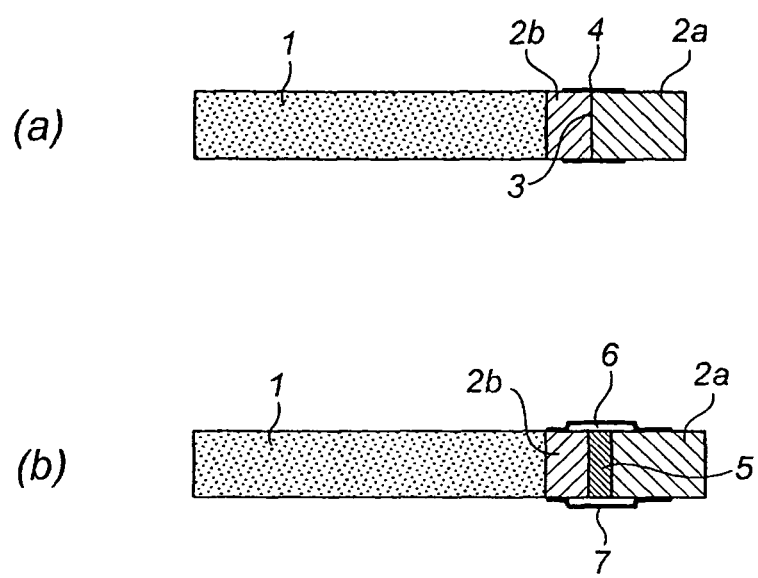

TOBACCO FILTER CONTAINING MAGNESIUM ALUMINOMETASILICATE

TECHNICAL FIELD

The present invention relates to a tobacco filter capable of selectively and efficiently eliminating aldehydes (in particular, formaldehyde) and to tobacco provided with the tobacco filter.

BACKGROUND ART

As an adsorbent for filtering a component in a tobacco smoke, a variety of constituent components are proposed. In JP-B 3 895327, equivalent to WO-A2003/056947, a cigarette is disclosed that is characterized by containing a tobacco rod and a filter being connected to the tobacco rod and containing compounds of hydrotalcites of 48.3 to 146.7 mg.

SUMMARY OF THE INVENTION

An object of the present invention is to provide a tobacco filter capable of selectively and efficiently eliminating aldehydes (in particular, formaldehyde) and provide tobacco provided with the tobacco filter.

The present invention provides a tobacco filter containing magnesium aluminometasilicate of 0.5 to 95% by mass and tobacco having the tobacco filter or a tobacco product having the tobacco filter or a cigarette having the tobacco filter or a filter product.

BRIEF DESCRIPTION OF THE DRAWINGS

FIG. 1 is an illustrative drawing of a testing method for confirming an adsorption effect of formaldehyde.

In FIGS. 1(a) and (b), the numeral reference 1 represents tobacco, 2 represents filter, 3 represents cut surface, 4 represents sealing tape, 5 represents magnesium aluminometasilicate layer, 6 represents glass tube, and 7 represents sealing tape.

DETAILED DESCRIPTION OF THE INVENTION

A tobacco filter of the present invention is excellent in a selective adsorption property for aldehydes, in particular for formaldehyde.

A tobacco filter of the present invention contains magnesium aluminometasilicate in a filter material. As the filter material, filter tow conventionally used in tobacco filters, non-woven fabrics or the like can be used.

Magnesium aluminometasilicate used in the present invention is a known component used as an antacid, a filler, and the like.

Although the particle size of the magnesium aluminometasilicate is not limited in particular, a particle size range of 100 µm to 1000 µm is preferred from the perspective of containing the magnesium aluminometasilicate in a predetermined ratio in the tobacco filter and enhancing the adsorption effect of aldehydes.

Although the specific surface area of magnesium aluminometasilicate is not limited in particular, the range of 100 $m^2/g$ to 300 $m^2/g$ is preferred from the perspective of enhancing the adsorption effect of aldehydes.

Although it is preferable that the pH of a 4% by mass slurry of such magnesium aluminometasilicate is in an alkaline region (from 8.5 to 10), the pH may also be in a neutral region (from 6 to 8).

In addition, the tobacco filter can also contain known various other components blended in tobacco filters such as perfumes.

The ratio of magnesium aluminometasilicate in the tobacco filter is from 0.5% by mass to 95% by mass of magnesium aluminometasilicate, is preferably from 2% by mass to 85% by mass, and is more preferably from 5% by mass to 70% by mass.

The tobacco filter of the present invention preferably has an embodiment either of:

(I) the one having a filter divided into two or three or more segments and having a layer containing magnesium aluminometasilicate in one spot or two or more spots between the adjacent segments; or (II) the one containing magnesium aluminometasilicate in a dispersed state in the filter.

In the embodiment of (I), in a case where the filter includes three or more segments, it is also possible to have one segment of a layer containing magnesium aluminometasilicate and the rest of the layers containing a perfume and the like.

The tobacco of the present invention is one provided with the tobacco filter mentioned above, which is effective in reducing aldehydes in the mainstream smoke of tobacco.

EXAMPLES

Examples and Comparative Example

A tobacco filter shown in FIG. 1(b) was produced in a manner described below to test the adsorption effect for aldehydes.

A filter of Peace Lights, trade name, (produced by Japan Tobacco, Inc.) was cut at a position 14 mm away from the end portion to separate it into filters 2a and 2b.

After removing the filter 2a, a glass tube 6 was fitted onto the remaining filter 2b to fill a predetermined amount of magnesium aluminometasilicate 5 (trade name Neusilin (CAS#12511-31-8); Fuji Chemical Industry Co., Ltd.). The types and properties of magnesium aluminometasilicate used in each Example are shown in Table 1.

The magnesium aluminometasilicate was treated with sieves having openings (JIS Z8801-1 2006) of 1.0 mm and 0.1 mm, respectively, to obtain that having a particle size of passing through the openings of 1.0 mm, but not passing through the openings of 0.1 mm. The filter was filled with the magnesium aluminometasilicate.

After that, the filter 2a was fitted into the glass tube 6 so as to sandwich the magnesium aluminometasilicate 5 with the filter 2b.

After that, resultant item was tightly sealed with a sealing tape 7 so as to completely cover contact surfaces of the glass tube 6 and the filters 2a and 2b to fabricate tobacco for testing. FIG. 1(a) is tobacco as a control, in which a filter was cut in the same manner as in FIG. 1(b) to make filters 2a and 2b and then they were tightly sealed with a sealing tape 4 so as to completely cover cut surfaces.

Through the use of the tobacco for testing shown in FIGS. 1(a), (b), measurement was carried out in a method described below by using a measuring device shown in FIG. 2 of JP-B 3895327. Results are shown in Table 1.

(Retention Rate of Formaldehyde)

Through the use of the tobacco for testing (FIG. 1b) and the tobacco as the control (FIG. 1a), smoking was carried out by a constant volume automatic smoking machine of a piston type (RM20/CS manufactured by Borgwaldt KC GmbH) under the conditions of a flow rate of 17.5 ml/second, a smoking time period of 2 seconds/time, and a smoking frequency of 1 time/minute. Formaldehyde in the mainstream smoke was collected in a DNPH (dinitrophenylhydrazine) solution and was derivatized with the DNPH, and then was measured by using a gas chromatograph (G-3000 manufactured by Hitachi, Ltd.) using the UV (ultraviolet) absorbance.

By defining an amount of formaldehyde collected by using the tobacco as the control as Tf and an amount of formaldehyde collected by using the tobacco for testing of Comparative Example and Examples as Cf, a formaldehyde retention rate was calculated by the following equation.

Formaldehyde Retention Rate (%) = $100 \times Cf/Tf$

A smaller retention rate of formaldehyde shows a more excellent adsorption performance for formaldehyde. Other aldehydes were also evaluated in a method similar to the above.

TABLE 1

| | Type of Magnesium Aluminometasilicate | | | Content of Magnesium Aluminometasilicate (% by mass) | Residual Ratio of Aldehydes (%) | | | |
|---|---|---|---|---|---|---|---|---|
| | Type | Specific Surface Area (m²/g) | pH of 4% by mass slurry | | Formaldehyde | Acetaldehyde | Propionaldehyde | Crotonaldehyde |
| Comparative Example 1 (Control) | (Not Used) | | | 0 | 100 | 100 | 100 | 100 |
| Example 1 | Neusilin SG2 | 110 | 9.2 | 33.8 | 26 | 90 | 61 | 37 |
| Example 2 | Neusilin SG2 | 110 | 9.2 | 16.9 | 34 | 97 | 82 | 71 |
| Example 3 | Neusilin US2 | 300 | 7.3 | 16.6 | 30 | 89 | 81 | 46 |

The invention claimed is:

1. A tobacco filter, comprising magnesium aluminometasilicate of CAS number 12511-31-8 in an amount of 0.5 to 95% by mass.

2. The tobacco filter according to claim 1, wherein the filter has a layer comprising magnesium aluminometasilicate therein.

3. The tobacco filter according to claim 1, wherein the filter comprises magnesium aluminometasilicate in a dispersed state therein.

4. A tobacco product, comprising tobacco and the tobacco filter according to claim 1.

5. The tobacco filter according to claim 1, wherein the magnesium aluminometasilicate is present in an amount of from 16.6-33.8 mass %.

* * * * *